United States Patent [19]
Miller et al.

[11] 3,885,642
[45] May 27, 1975

[54] FINAL DRIVE MOUNTING FOR A TRACK-TYPE VEHICLE

[75] Inventors: Calvin L. Miller, Aurora; Harvey A. Knell, Joliet, both of Ill.

[73] Assignee: Caterpillar Tractor Co., Peoria, Ill.

[22] Filed: May 20, 1974

[21] Appl. No.: 471,207

[52] U.S. Cl. ............ 180/9.2 R; 180/6.48; 180/9.62; 305/60
[51] Int. Cl. ............................................ B62d 55/08
[58] Field of Search ............... 180/9.2 R, 9.62, 9.64, 180/9.5, 6.48, 6.7, 6.58; 305/28, 60

[56] References Cited
UNITED STATES PATENTS

| | | | |
|---|---|---|---|
| 1,901,269 | 3/1933 | Snow | 180/9.62 |
| 2,049,672 | 8/1936 | Starr | 305/60 |
| 3,773,128 | 11/1973 | Bowen | 180/9.62 X |

*Primary Examiner*—David Schonberg
*Assistant Examiner*—John A. Pekar
*Attorney, Agent, or Firm*—Phillips, Moore, Weissenberger, Lempio & Strabala

[57] ABSTRACT

A final drive for a track-type vehicle comprises a housing secured to a pair of overlapped and parallel outer and inner rails of a track roller frame. The housing is secured to an inner side of the outer rail by a tubular connector and to an end of the inner rail at an integral extension of the housing.

8 Claims, 4 Drawing Figures

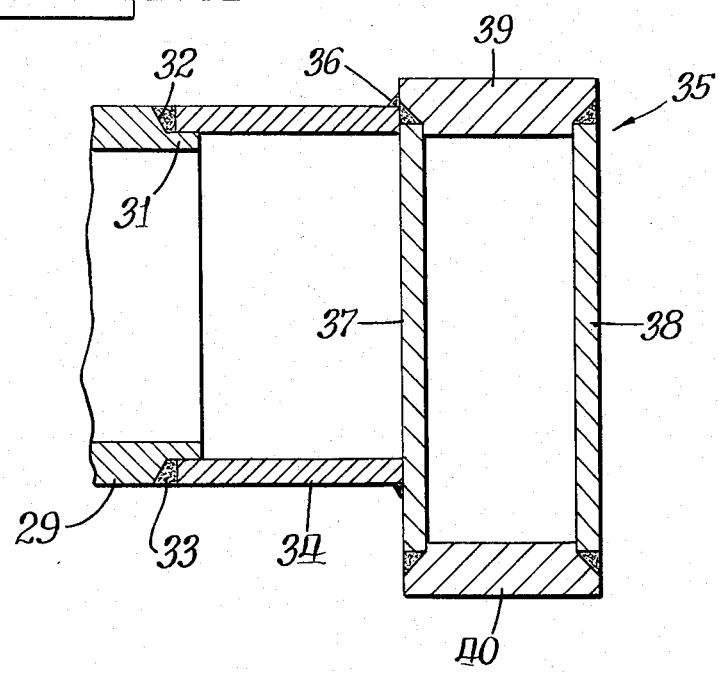
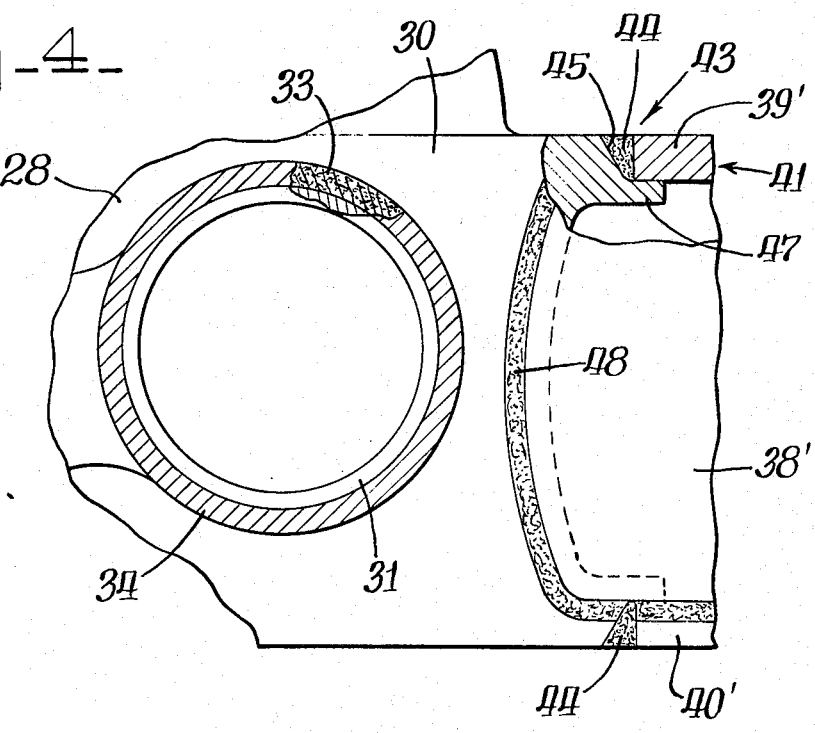

FINAL DRIVE MOUNTING FOR A TRACK-TYPE VEHICLE

BACKGROUND OF THE INVENTION

The final drive for a conventional track-type vehicle is either detachably mounted or fixedly secured on a track roller frame. In the former case, the final drive housing may be bolted to the frame at a mounting flange thereof, as taught in U.S. Pat. No. 3,773,128, assigned to the assignee of this application. In the latter case, the final drive housing is normally secured in place by means of a complicated arrangement of integrated reinforcement plates and complex weldments.

Such a complex structure is costly to manufacture and oftentimes results in a poor stress distribution between the final drive case and the track roller frame to thus induce structural failure thereat. One costly solution to the problems is to enlarge and otherwise structurally reinforce the cast final drive housing. In addition to the above problems, such prior art structures accumulate mud and the like thereon which tends to reduce the life expectancy of the track rollers closely associated therewith.

SUMMARY AND OBJECTS OF THIS INVENTION

An object of this invention is to overcome the above, briefly described problems by providing a non-complex and economical mounting for securing the housing of a final drive to a track roller frame. The track roller frame comprises a pair of overlapped and parallel outer and inner rails adapted to carry a plurality of track rollers and an endless track thereon. In the preferred embodiment of this invention, the housing is secured to an inner side of the outer rail by a tubular connector and is further secured to an end of the inner rail by an extension integrally secured thereon to provide a high degree of structural integrity between the housing and rails.

BRIEF DESCRIPTION OF THE DRAWINGS

Further objects of this invention will become apparent from the following description and accompanying drawings wherein:

FIG. 3 is an enlarged sectional view, taken in the direction of arrows III—III in FIG. 2; and FIG. 4 is an enlarged sectional view, taken in the direction of arrows IV—IV in FIG. 2.

DESCRIPTION OF THE PREFERRED EMBODIMENT

Figure 1:
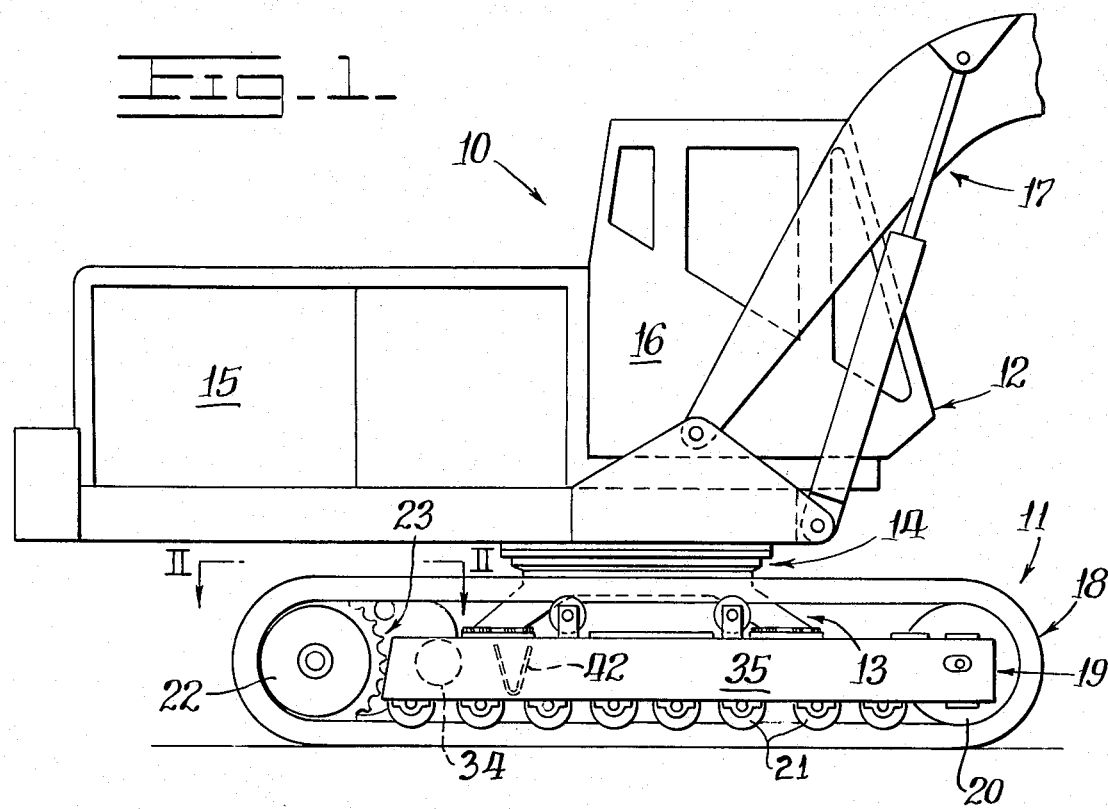
FIG. 1 is a partial, side elevational view of a hydraulic excavator employing the final drive mounting of this invention therein.

FIG. 1 illustrates a track-type vehicle 10, such as a hydraulic excavator, having its undercarriage 11 disposed for movement along a longitudinal axis thereof. An upper unit 12 is rotatably mounted on the undercarriage by means of a straddling mounting platform 13 and a turntable, generally indicated at 14. The upper unit comprises a power plant 15, an operator's station 16 and an implement mounting boom 17.

The undercarriage comprises a pair of laterally spaced endless track assemblies 18 (one shown) each suitably mounted on a track roller frame 19 by a forwardly disposed idler wheel 20, a plurality of track rollers 21 and a driving sprocket 22. A final drive 23 is disposed on each side of the vehicle to rotate a respective driving sprocket to propel the vehicle in a forward or reverse direction in a conventional manner.

Figure 2:
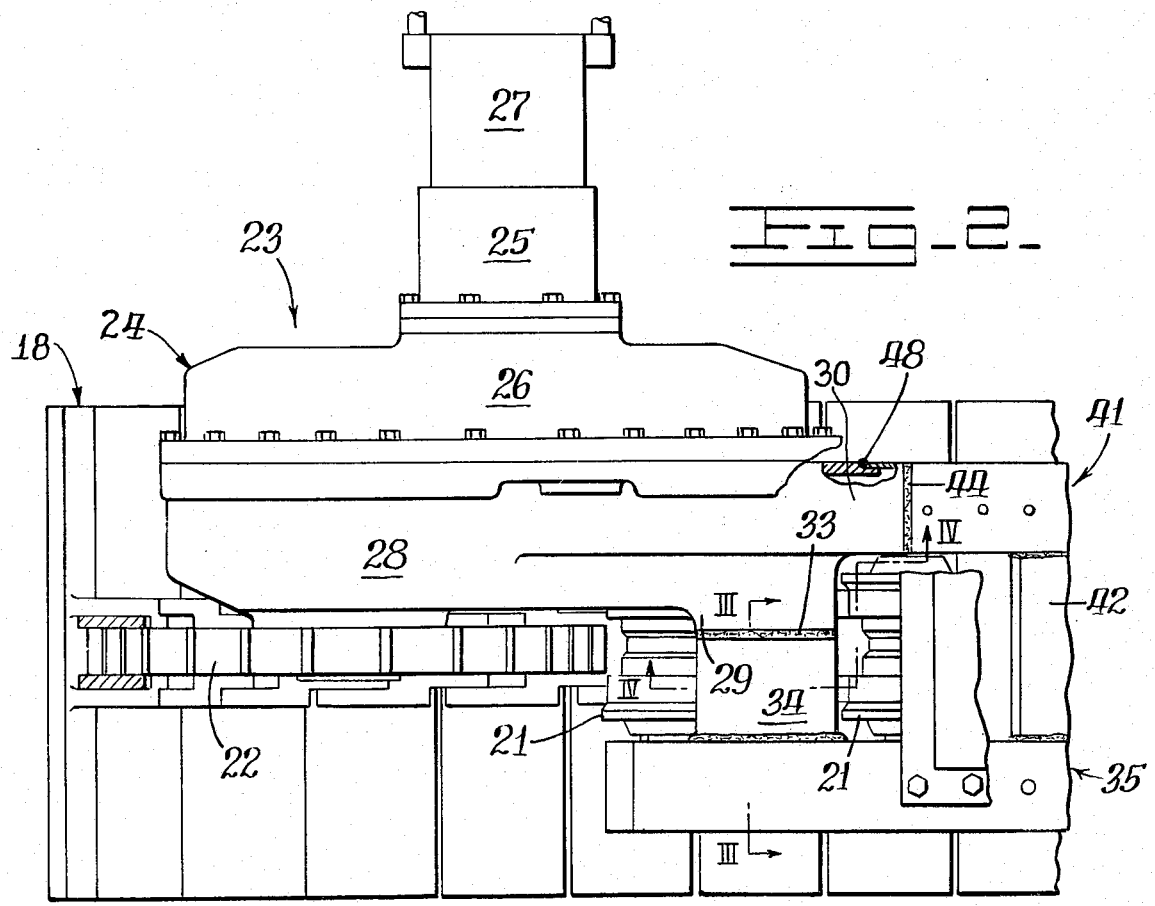
FIG. 2 is an enlarged, top plan view of the final drive mounting, taken in the direction of arrows II—II in Fig. 1.

Referring to FIG. 2, final drive 23 comprises a multi-part housing 24 having a parking brake module 25 detachably mounted on a removable cover 26 thereof. A conventional hydrostatic drive motor 27 is detachably mounted on the housing of the parking brake to selectively drive sprocket 22 under control of the operator. In particular, the motor is reversible and is adapted to rotate the driving sprocket in either direction at a reduced speed through a speed reduction gear train (not shown) disposed within housing 24.

Housing 24 further comprises a cast steel outer case 28 having a transversely disposed first tubular member or boss 29 and a longitudinally and forwardly extending second tubular member or hollow beam 30 formed integrally therewith to comprise first and second connection means, respectively. Referring to FIGS. 3 and 4, boss 29 terminates at an extension 31 of reduced diameter which extends outwardly from a conically shaped shoulder 32 thereof. The shoulder accommodates an annular weld 33 in a groove defined between it and first end of a tubular connector 34 which is disposed in telescopic relationship with extension 31. The second, opposite end of the connector is secured to an outer rail 35 of track roller frame 19 by an annular weld 36 constituting first weld means along with weld 33.

The outer rail comprises a box section having a pair of parallel side plates 37 and 38 welded to a pair of top and bottom plates 39 and 40, respectively. Referring to FIG. 2, the outer rail 35 is secured to an inner rail 41 of the track roller frame by a plurality of longitudinally spaced connecting members 42 (one shown) which are suitably welded therebetween. Inner rail 41 is also constructed as a box section, similar to the construction of outer rail 35 as shown in FIG. 3.

Referring to FIGS. 2 and 4, the forward end of beam 30 of outer case 28 is secured to a rearward end of inner rail 41 by a second weld means 43. Upper and lower welds 44 of the second weld means are each positioned in a transverse groove defined between an end of the inner rail and an inclinably surfaced shoulder 45 of beam 30. A pair of reduced extensions 47 of the beam are received in telescopic relationship within the inner rail to vertically position it.

It should be noted in FIG. 4 that the rearward ends of side plates 38' (one shown), corresponding to plates 38 in FIG. 3, are arcuate and extend rearwardly beyond top and bottom plates 39' and 40'. The side plates overlap the sides of beam 30 and are welded thereto by a pair of arcuate welds 48 of weld means 43.

From the above description it can be seen that the longitudinally staggered and transverse disposition of the above-described first and second connection means aids in positively securing housing 24 on the track roller frame and further aids in uniformly distributing forces imposed thereon during vehicle operation. It should be noted that connector 34 is preferably formed as a separate member although it could be formed integrally with case 28, i.e., as an extension of boss 29. The tubular connector inherently increases the structural integrity of the integrated mounting and further aids in preventing the accumulation of mud and the like therearound. In particular, mud and other debris will tend to slide-off the tubular connector during operation of the vehicle to prevent egress thereof into the area of sprocket 22.

We claim:

1. A track-type vehicle disposed for movement along a longitudinal axis thereof comprising
    a track roller frame having a pair of laterally spaced outer and inner rails,
    a final drive having a housing, and
    mounting means securing said housing to said frame comprising first connection means securing said housing to an inner side of said outer rail and second connection means securing said housing to a rearward end of said inner rail.

2. The vehicle of claim 1 wherein said vehicle constitutes a hydraulic excavator.

3. The vehicle of claim 1 wherein said first connection means comprises a first tubular member formed integrally with said housing and extending transversely therefrom and relative to said axis.

4. The vehicle of claim 3 wherein said second connection means comprises a second tubular member formed integrally with said housing and extending forwardly therefrom and in the direction of said axis.

5. The vehicle of claim 3 wherein said first connection means further comprises a separate tubular connector secured between said first tubular member and said outer rail.

6. The vehicle of claim 5 wherein ends of said tubular connector and said first tubular member are disposed in telescopic relationship and further comprising annular common weld means disposed in an annular groove defined therebetween.

7. The vehicle of claim 4 wherein said first connection means further comprises first weld means securing said first tubular member to said outer rail and said second connection means further comprises second weld means securing said second tubular member to said inner rail, said first and second weld means disposed in transverse and in longitudinally spaced relationship relative to each other in the direction of said axis.

8. The vehicle of claim 4 wherein ends of said second tubular member and said inner rail are disposed in telescopic relationship and weld means disposed in a peripheral groove defined therebetween.

\* \* \* \* \*